United States Patent [19]
Yazawa et al.

[11] Patent Number: 5,555,541
[45] Date of Patent: Sep. 10, 1996

[54] EXCHANGE CONNECTED TO A CONTROL CHANNEL JUNCTION LINE

[75] Inventors: Shigehiko Yazawa; Kazuhiko Ito; Takeshi Uehara; Toru Tachibana; Keiji Fukuda, all of Kawasaki, Japan

[73] Assignee: Fujitsu Limited, Kanagawa, Japan

[21] Appl. No.: 118,396

[22] Filed: Sep. 8, 1993

[30] Foreign Application Priority Data

Sep. 8, 1992 [JP] Japan ................... 4-239611

[51] Int. Cl.⁶ ........................................ H04J 3/22
[52] U.S. Cl. ...................... 370/68.1; 370/84; 370/112
[58] Field of Search ................... 370/58.1, 58.2, 370/60, 60.1, 79, 80, 82, 84, 110.1, 112, 68.1, 110.4, 111, 95.1

[56] References Cited

U.S. PATENT DOCUMENTS 4,987,570  1/1991  Almond et al. ............... 370/84

FOREIGN PATENT DOCUMENTS 1291554  11/1989  Japan .
479444   3/1992   Japan .
4158660  6/1992   Japan .

Primary Examiner—Wellington Chin
Assistant Examiner—Huy D. Vu

[57] ABSTRACT

A control channel junction line system for use with a digital switching network wherein a talking channel used in a control channel is used in a high efficiency is disclosed. Each exchange of the system includes a digital junction line trunk, a low rate information multiplexing trunk, a low rate control channel processing section and a multiplexing/demultiplexing section. When the low rate information multiplexing trunk is connected to a channel on which the control channel is to be carried, one of the circuits corresponding to a time slot used for control channel information is disabled. Upon transmission, the control channel information from the low rate control channel processing section and information from the low rate information multiplexing trunk are multiplexed with each other by and sent out from the multiplexing/demultiplexing section. Upon reception, the control channel information and the information the low rate information multiplexing trunk are demultiplexed by the multiplexed/demultiplexing section. The control channel information is processed by the low rate control channel processing section while the information to the low rate information multiplexing trunk is inputted to the low rate information multiplexing trunk.

6 Claims, 17 Drawing Sheets

FIG. 4

| # | |
|---|---|
| #1 | B |
| 2 | B |
| 3 | B |
| 4 | B |
| 5 | B |
| 6 | Bd |
| 7 | B |
| | B |
| | B |
| | B |
| | B |
| | B |
| | B |
| 14 | Bd |
| | B |
| | B |
| | B |
| | B |
| | B |
| | B |
| | B |
| | B |
| 23 | B |
| 24 | Bd |

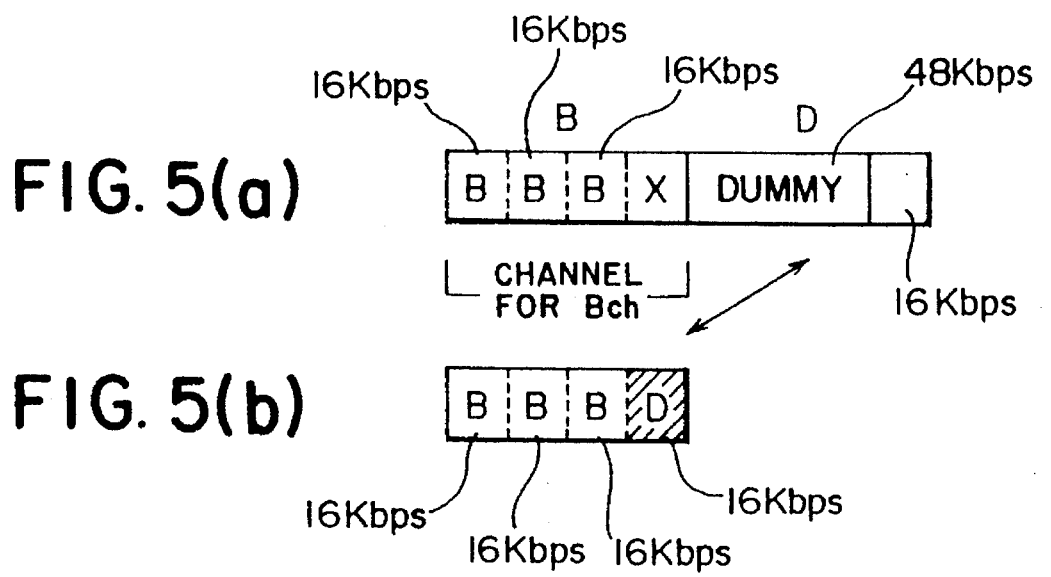
FIG. 5(a)
FIG. 5(b)
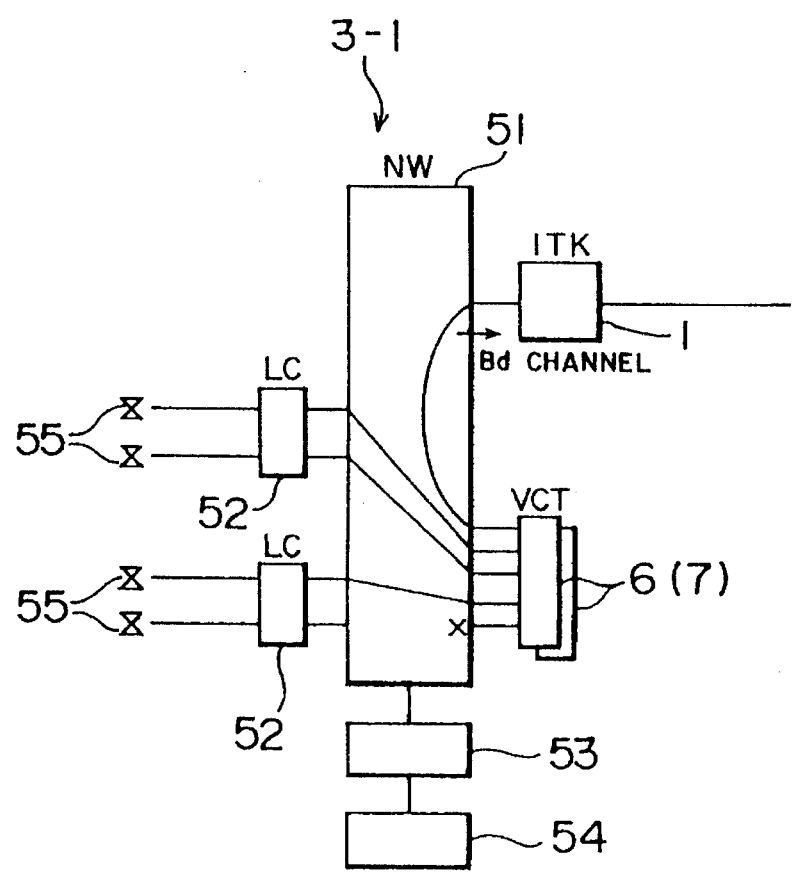
FIG. 6

EXCHANGE CONNECTED TO A CONTROL CHANNEL JUNCTION LINE

BACKGROUND OF THE INVENTION

This invention relates to an exchange connected to a control channel junction line for a switching network wherein a plurality of digital exchanges are interconnected by way of digital junction lines (leased lines).

Although the number of talking channels between exchanges of a switching network is not always very great, if speech compression is involved, the number of talking channels used by the exchanges is further reduced. Therefore, enhancement in efficiency of control channels for controlling talking channels is demanded.

FIG. 15 schematically shows a digital switching network. Referring to FIG. 15, the network (leased network) shown includes a plurality of exchanges (PBX) 3-3.

Referring now to FIG. 16, each exchange 3-3 includes a digital junction line trunk 101, a plurality of speech compression trunks (VCT) 6 for 16 Kbps serving as low rate information multiplexing trunks, a speech path (NW) 51, a plurality of (two in FIG. 16) subscriber circuits (LC) 52, a main controller (CC) 53, and a main storage apparatus (MM) 54. A plurality of terminals 55 are connected to the exchange 3-3.

The digital junction line trunk 101 adds a D channel to multiplexed low rate information transmitted thereto from any of the 16 Kbps speech compression trunks 6, decomposes frames of digital information from a digital junction line to extract F (frame) bits and data and decomposes such data to extract compressed speech information and D channel information.

To this end, referring now to FIG. 17, the digital junction line trunk 101 includes a control channel transmission/reception apparatus 104, a pair of time switches 11A and 11B, a pair of multiplexing apparatus 12A and 12B, a pair of demultiplexing apparatus 13A and 13B, a framing and deframing section 14, a driver 15, a receiver 16, a line processor 18 and a memory 19.

The control channel transmission/reception apparatus 104 processes a D (control) channel (refer to ③ in FIG. 18) of 64 Kbps. In particular, the control channel transmission/reception apparatus 104 outputs a D channel received from the line processor 18 at the rate of 64 Kbps in accordance with a timing of a clock signal. Further, when a D channel transmitted at the rate of 64 Kbps is received, the control channel transmission/reception apparatus 104 outputs such control information to the line processor 18.

Each of the time switches 11A and 11B replaces or re-arranges the positions of time slots of a signal on an input highway in accordance with time slot position change designation information from the line processor 18.

Each of the multiplexing apparatus 12A and 12B multiplexes a plurality of time slots into the signal highway. Each of the demultiplexing apparatus 13A and 13B demultiplexes digital information on the highway into individual time slots.

The deframing and framing section 14 decomposes, from each frame of digital information received by way of the receiver 16 and having bit information of 1.5 Megabits, into F bits at the top of the frame and the remaining data, and stores such data obtained by way of the receiver 16 once into a memory and outputs the data at the rate of 2 Mbps (megabits/ second) of the internal highway in the trunk 101.

Further, the deframing and framing section 14 adds F bits to the top of each of data successively transmitted thereto at the rate of 2 Mbps from the multiplexing apparatus 12A to compose a frame, constructs digital information from such frames thus composed and sends the digital information at 1.5 Mbps by way of the driver 15.

The line processor 18 controls the time switches 11A and 11B in accordance with an instruction of the main controller 53 and sends a designated D channel to the control channel transmission/reception apparatus 104. The line processor 18 can communicate with the main controller 53. The memory 19 serves as a storage apparatus for the line processor 18.

In the digital junction line trunk 101 of the construction described above, a multiplexed compressed speech signal from any of the 16 Kbps speech compression trunks 6 is transmitted at the rate of 2 Mbps to the demultiplexing apparatus 13A. The compressed speech signal of 2 Mbps is demultiplexed into data of the rate of 64 Kbps equal to that before multiplexing by the demultiplexing apparatus 13A (refer to ② of FIG. 18). Then, the time slot positions of the thus demultiplexed data are replaced or re-arranged by the time switch 11A to which the data are outputted from the demultiplexing apparatus 13A.

Meanwhile, the control channel transmission/ reception apparatus 104 outputs D channel information transmitted thereto from the line processor 18 to the time switch 11A at the rate of 64 Kbps.

Also the D channel information (refer to ③ of FIG. 18) is processed by replacement of re-arrangement of the time slot positions thereof by the time switch 11A similarly to the compressed speech signal described above.

The data (compressed speech information) and the D channel information from the compressed speech signal for which replacement of the time slot positions has been performed by the time switch 11A are individually outputted to the multiplexing apparatus 12A.

Thus, the compressed speech information in a demultiplexed condition is multiplexed by the multiplexing apparatus 12A so that it may include the D channel information, and the thus multiplexed information is outputted at the rate of 2 Mbps to the deframing and framing section 14.

The deframing and framing section 14 having received the thus multiplexed data provides F bits to each frame of the data to construct digital information and outputs the digital information at the rate of 1.5 Mbps to the digital junction line.

Meanwhile, digital information of 1.5 Mbps transmitted from another digital junction line is received by way of the receiver 16 by the deframing and framing section 14, in which the digital information is decomposed into F bits and data for each frame while it remains in a multiplexed condition.

A plurality of multiplexed data (refer to ① of FIG. 18) obtained in this manner and destined for the terminals 55 are sent at the rate of 2 Mbps to and demultiplexed by the demultiplexing apparatus 13B and outputted as a plurality of data of the rate of 64 Kbps from the demultiplexing apparatus 13B.

Thereafter, each of the thus demultiplexed data is processed by replacement of time slot positions by the time switch 11B. After completion of such replacement of the time slot positions, D channel information of the data is sent to the line processor 18 by way of the control channel transmission/reception apparatus 104 while the compressed speech information is sent to the multiplexing apparatus 12B.

The D channel information transmitted to the line processor 18 is further sent to the main controller 53. Meanwhile, the compressed speech information transmitted to the multiplexing apparatus 12B is multiplexed again by the multiplexing apparatus 12B. In other words, compressed speech information from which D channel information has been removed is multiplexed. Thereafter, the compressed speech information multiplexed by the multiplexing apparatus 12B is outputted to the channel 51.

By the way, the 16 Kbps speech compression trunk 6 of FIG. 16 mentioned hereinabove multiplexes compressed speech signals of low rate information transmitted thereto from the terminals 55 by way of the associated subscriber circuits 52 and the speech path 51.

In particular, the 16 Kbps speech compression trunk 6 compresses compressed speech signals supplied thereto from the terminals 55 side to 16 Kbps and outputs four such signals into a B channel.

Further, the 16 Kbps speech compression trunk 6 demultiplexes a speech compression signal from the B channel supplied thereto from the junction line side and distributes the compressed speech signals obtained by the demultiplexing to the terminals 55. It is to be noted that, while the 16 Kbps speech compression trunk 6 compresses a compressed speech signal into 16 Kbps, it may be replaced by another speech compression trunk for compressing a compressed speech signal into 32 Kbps (32 Kbps speech compression trunk).

The main controller 53 is a CPU (central processing unit) for performing management and control of the exchange, and the main storage apparatus 54 is a memory which is used when the main control controller 53 performs its management and control functions.

In the exchange 3-3 of the construction described above, compressed speech signals from the terminals 55 are multiplexed by one of the 16 Kbps speech compression trunks 6. Then, the multiplexed compressed speech signal is additionally provided with a D channel by the digital junction line trunk 101 and sent at the rate of 1.5 Mbps into the digital junction line.

In particular, as seen from FIG. 15, multiplexed data from any of the exchanges to a particular destination are distributed by the leased network to a particular one of the exchanges. It is to be noted that the multiplexed data illustrated at ① of FIG. 18 corresponds to the multiplexed data illustrated at ① of FIG. 15.

By the way, the exchange described above sometimes has such a modified construction that, as shown in FIG. 19, it includes a plurality of digital junction line trunks 101 some of which are provided with a time division multiplexing apparatus (TDM) 56.

However, such control channel junction line systems as described above have a subject to be solved in that the efficiency in use of channels is low since even a D channel which involves a small amount of information conforms to the CCITT standards and is transmitted at the rate of 64 Kbps similarly to a B channel.

SUMMARY OF THE INVENTION

It is an object of the present invention to provide an exchange connected to a control channel junction line wherein a talking channel which is used in a D channel is used in a high efficiency.

In order to attain the object described above, according to an aspect of the present invention, there is provided a control channel junction line system, which comprises a plurality of exchanges each including a low rate information multiplexing trunk, low rate control channel processing means provided for each of the exchanges for processing a low rate control channel, and multiplexing/demultiplexing means provided for each of the exchanges for multiplexing/demultiplexing the control channel and information of the low speed information multiplexing trunk, and wherein, when the low rate information multiplexing trunk is connected to a channel on which the control channel is to be carried, one of circuits having a bit rate corresponding to the bit rate used for the control channel is disabled, and upon transmission, the control channel from the low rate control channel processing means and information from the low rate information multiplexing trunk are multiplexed with each other by and sent out from the multiplexing/demultiplexing means, but upon reception, the control channel and the information to the low rate information multiplexing trunk are demultiplexed by the multiplexing/demultiplexing means, and the control channel is processed by the low rate control channel processing means while the information to the low rate information multiplexing trunk is inputted to the low rate information multiplexing trunk.

Preferably, the low rate control channel processing means and the multiplexing/demultiplexing means are provided in the digital junction line trunk.

According to a second aspect of the present invention, there is provided a control channel junction line system, which comprises a plurality of exchanges each including a digital junction line trunk, a low rate information multiplexing trunk, a subrate control channel trunk including low rate control channel processing means for processing a low rate control channel and multiplexing/demultiplexing means for multiplexing/demultiplexing the control channel and information of the low rate information multiplexing trunk, the subrate control channel trunk fixedly connecting multiplexed information from the multiplexing/demultiplexing means to the digital junction line trunk by way of a path line, each of the exchanges being capable of handling the subrate control channel trunk and the digital junction line trunk as an interface group, and wherein, when the low rate information multiplexing trunk is connected to a channel on which the control channel is to be carried, one of circuits having a bit rate the bit rate of the control channel is disabled, and upon transmission, the control channel from the low rate control channel processing means and information from the low rate information multiplexing trunk are multiplexed with each other by and sent out from the multiplexing/demultiplexing means of the subrate control channel trunk, but upon reception, the control channel and the information to the low rate information multiplexing trunk are demultiplexed from each other by the multiplexing/demultiplexing means of the subrate control channel trunk, and the control channel is processed by the low rate control channel processing means while the information to the low rate information multiplexing trunk is inputted to the low rate information multiplexing trunk.

In each case, a speech compression trunk or a low rate data call multiplexing trunk may be employed for the low rate information multiplexing trunk.

With the control channel junction line systems, the rate of the D channel (control channel) can be reduced, and the remaining frequency band of the D channel can be utilized effectively. Consequently, there is an advantage in that the efficiency in use of the channel is enhanced.

Further objects, features and advantages of the present invention will become apparent from the following detailed description when read in conjunction with the accompanying drawings in which like parts or elements are denoted by like reference characters.

BRIEF DESCRIPTION OF THE DRAWINGS

FIG. 4 is a diagrammatic view illustrating contents of the software for operating a line processor of the junction line trunk shown in FIG. 3;

FIGS. 5(a) and 5(b) are diagrammatic views showing a Bd channel, and a B channel and a D channel before multiplexing;

FIG. 6 is a block diagram of an exchange employing the digital junction line trunk of FIG. 3;

DESCRIPTION OF THE PREFERRED EMBODIMENTS a. Principle of the Present Invention FIG. 1 illustrates the principle of the first aspect of the present invention. Referring to FIG. 1, an exchange 3-1 for use with a control channel junction line system of the present invention accommodates a plurality of terminals 55. The exchange 3-1 includes a digital junction line trunk 1, a low rate information multiplexing trunk 2, a speech path (NW) 51, a plurality of subscriber circuits (LC) 52, a main controller (CC) 53 and a main storage apparatus (MM) 54.

Figure 1:
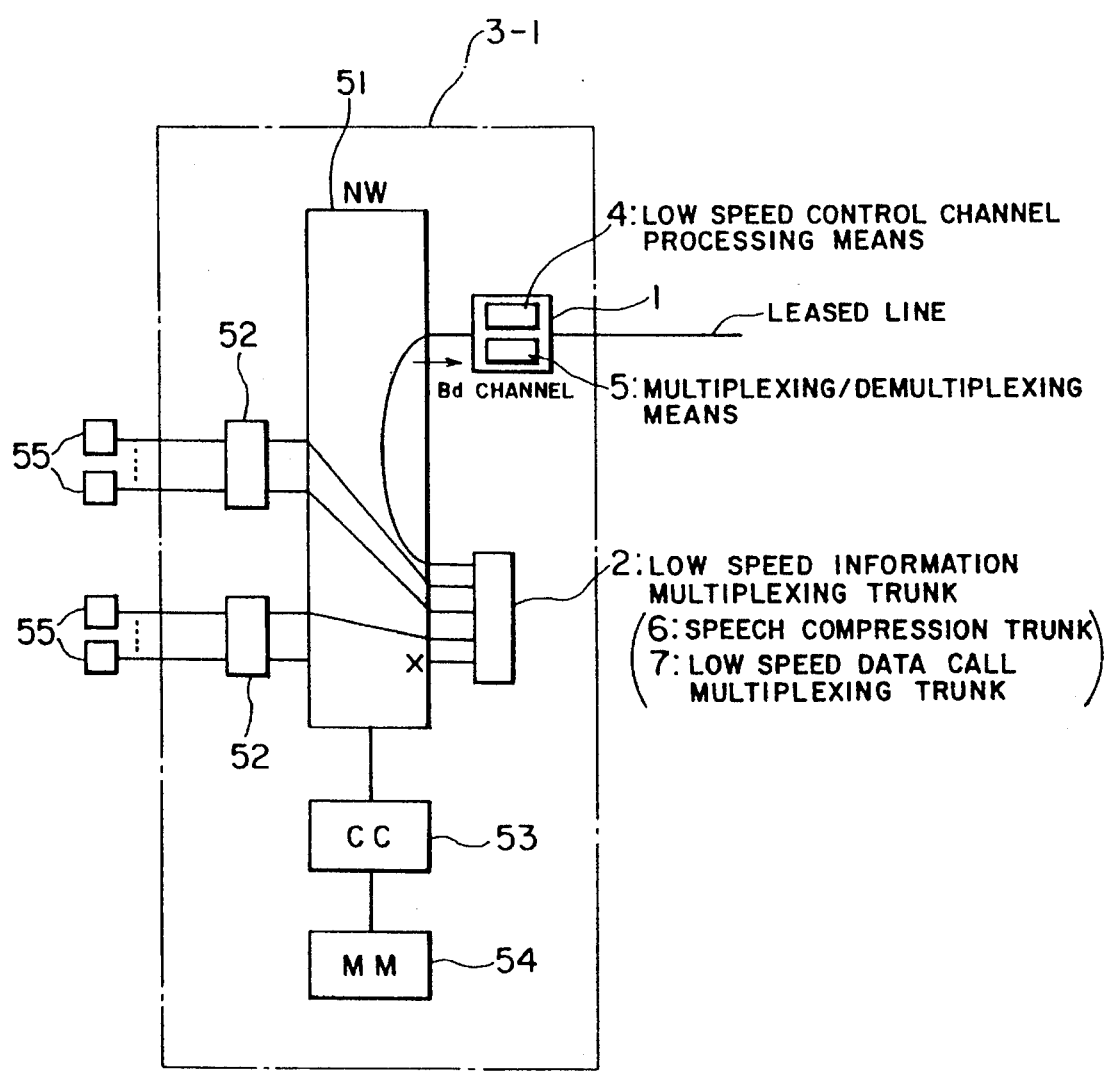
FIG. 1 is a block diagram illustrating the principle of a first aspect of the present invention.

Here, the digital junction line trunk 1 intermediates communication of a signal between a digital junction line side and a subscriber side. The digital junction line trunk 1 includes low rate control channel processing means 4 and multiplexing/demultiplexing means 5 and can thus achieve enhancement in efficiency of a D channel.

The low rate control channel processing means 4 processes a low rate control channel, and the multiplexing/demultiplexing means 5 multiplexes and demultiplexes information of a control channel and information of the low rate information multiplexing trunk 2 from each other.

Meanwhile, the low rate information multiplexing trunk 2 multiplexes low rate information, and a speech compression trunk 6 or a low rate data call multiplexing trunk 7 is used as the low rate information multiplexing trunk 2.

Figure 2:
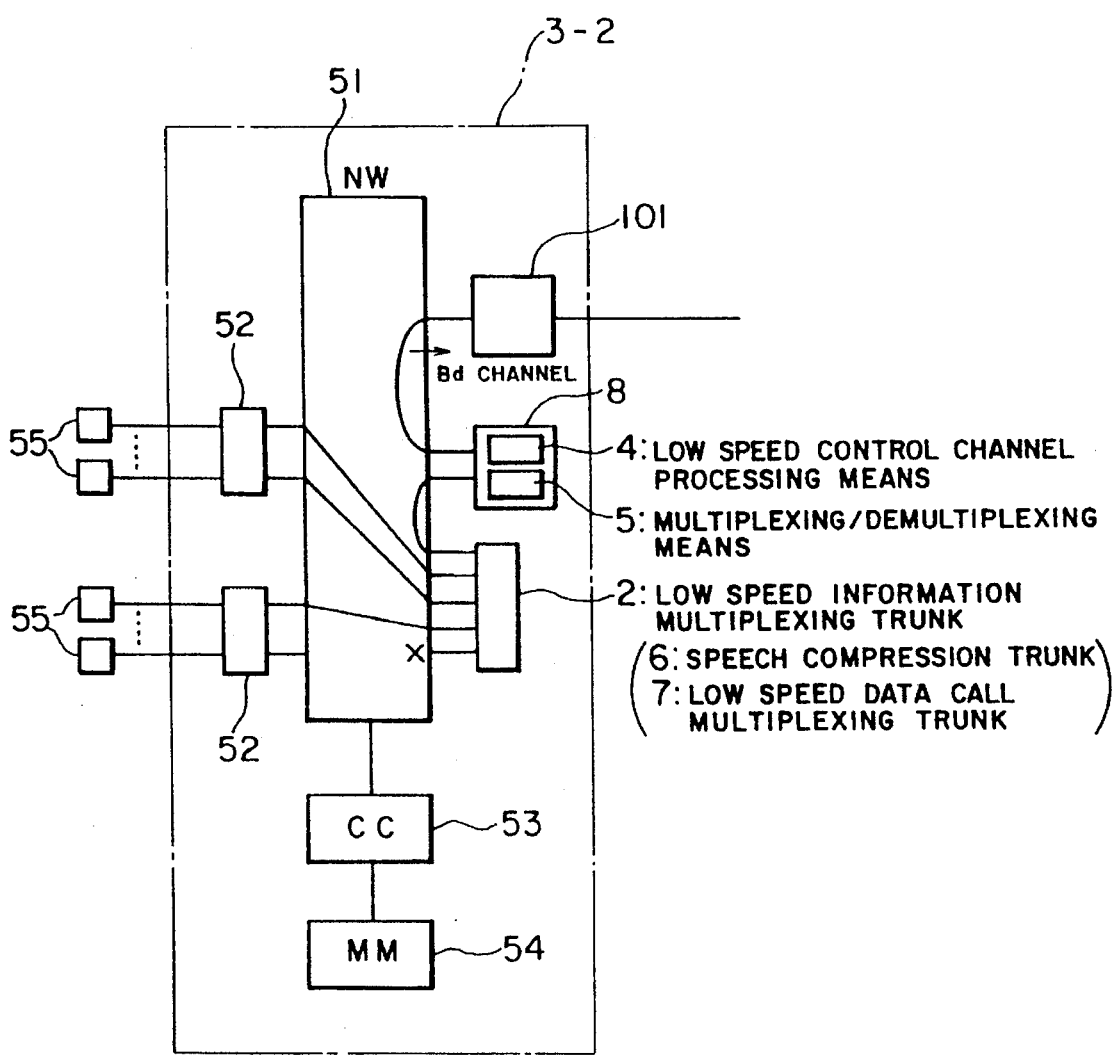
FIG. 2 is a block diagram illustrating the principle of a second aspect of the present invention.

FIG. 2 illustrates the principle of the second aspect of the present invention. Referring to FIG. 2, an exchange 3-2 for use with a control channel junction line system of the present invention accommodates a plurality of terminals 55. The exchange 3-2 is a modification to the exchange 3-1 described above according to the first aspect of the present invention in that the digital junction line trunk 1 is replaced by another digital junction line trunk 101. Further, in the exchange 3-2, a subrate control channel trunk 8 is connected to a speech path 51.

The exchange 3-2 can thus handle the subrate control channel trunk 8 and the digital junction line trunk 101 as an interface group.

The digital junction line trunk 101 is different from the digital junction line trunk 1 of the exchange 3-1 according to the first aspect of the present invention in that it eliminates the low rate control channel processing means 4 for processing a low rate control channel and the multiplexing/demultiplexing means 5 for multiplexing/demultiplexing a control channel and information of the low rate information multiplexing trunk 2. In other words, the digital junction line trunk 1 intermediates communication of a signal between a digital junction line side and a subscriber side.

The subrate control channel trunk 8 includes low rate control channel processing means 4 and multiplexing/demultiplexing means 5 of the exchange 3-1 described hereinabove in connection with the first aspect of the present invention. In particular, the subrate control channel trunk 8 fixedly connects multiplexed information from the multiplexing/demultiplexing means 5 to the digital junction line trunk 10 by way of the speech path 51 of the exchange 3-2.

Accordingly, in the first aspect of the present invention described above, when the low rate information multiplexing trunk 2 is connected to a channel on which a control channel is carried as shown in FIG. 1, a circuit having a bit rate corresponding to a bit rate used for the control channel is disabled.

In this manner, upon transmission, a control channel from the low rate control channel processing means 4 and information from the low rate information multiplexing trunk 2 are multiplexed with each other by and sent out from the multiplexing/demultiplexing means 5 of the digital junction line trunk 1.

On the other hand, upon reception, a control channel and information to the low rate information multiplexing trunk 2 are demultiplexed from each other by the multiplexing/demultiplexing means 5, and the thus demultiplexed control channel is processed by the low rate control channel processing means 4. Meanwhile, the information to the low rate information multiplexing trunk 2 is inputted to the low rate information multiplexing trunk 2.

In the meantime, in the second aspect of the present invention, the subrate control channel trunk 8 and the digital junction line trunk 1 are handled as an interface group by the exchange 3-2 as seen in FIG. 2.

When the low rate information multiplexing trunk 2 is connected to a channel on which a control channel is carried, a circuit having a bit rate corresponding to a bit rate used by the control channel is disabled.

Thus, upon transmission, the multiplexing/demultiplexing means 5 in the subrate control channel trunk 8 multiplexes a control channel from the low rate control channel processing means 4 and information from the low rate information multiplexing trunk 2 and outputs the thus multiplexed information.

On the other hand, upon reception, a control channel and information to the low rate information multiplexing trunk 2 are demultiplexed from each other by the multiplexing/demultiplexing means 5 in the subrate control channel trunk 8. The thus demultiplexed control channel is processed by the low rate control channel processing means 4 while the information to the low rate information multiplexing trunk 2 is inputted to the low rate information multiplexing trunk 2.

In this manner, according to the control channel junction line system of the present invention, the D channel can be reduced in rate and the remaining frequency band of the D channel can be utilized effectively, and accordingly, there is an advantage in that the efficiency in use of the channel is enhanced.

b. First Embodiment

FIG. 6 shows an exchange for use with a control channel junction line system according to a first preferred embodiment of the present invention. Referring to FIG. 6, the exchange is generally denoted at 3-1 and is a modification and an improvement to the exchange 303 described hereinabove with reference to FIG. 16 in that it includes, in place of the digital junction line trunk (ITK) 101, a digital junction line trunk (ITK) 1 connected to a leased line.

Figure 16:
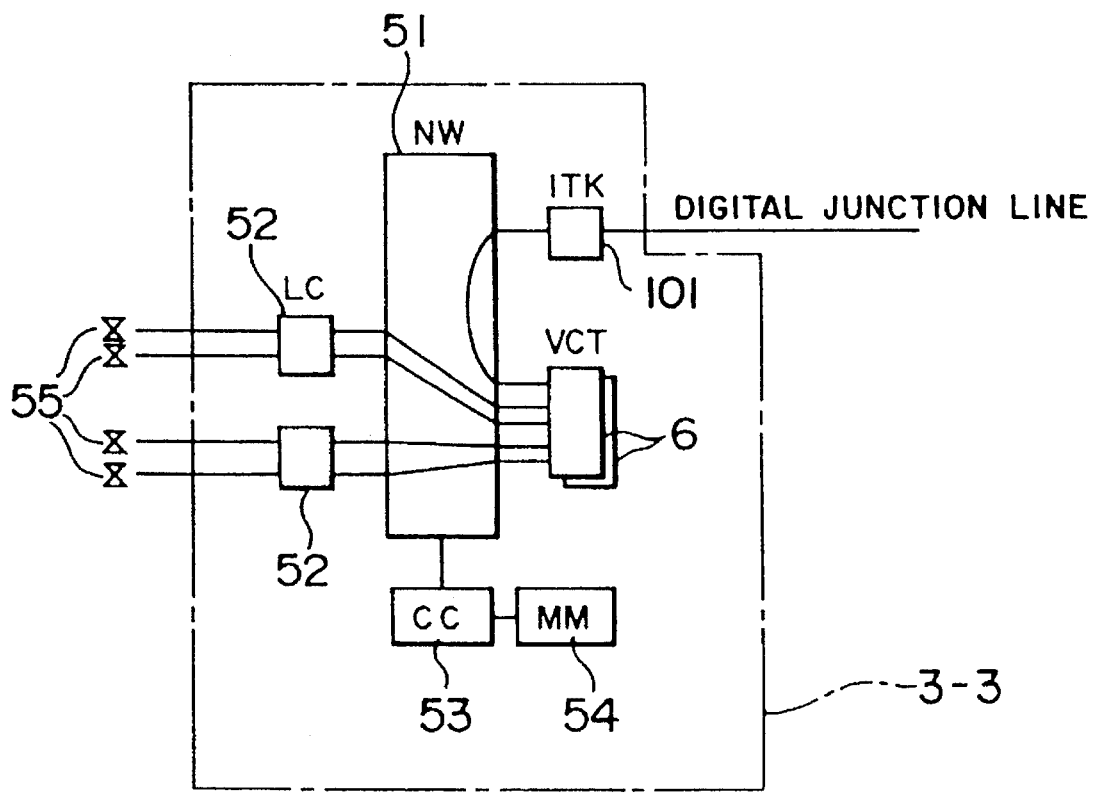
FIG. 16 is a block diagram showing an exchange.

It is to be noted that the other elements shown in FIG. 6, that is, a speech path 51, a plurality of (two are shown in FIG. 6) subscriber circuits 52, a main controller 53, a main storage apparatus 54, a plurality of terminals 55 and a plurality of 16 Kbps speech compression trunks 6, are similar to those of FIG. 16.

However, the software registered in the main storage apparatus 54 for operating the 16 Kbps speech compression trunks 6 is so constructed that, when any of the 16 Kbps speech compression trunks 6 produces a channel onto which compressed speech information and control information are to be carried, compressed speech information which can be carried onto the channel is limited to 48 Kbps. Further, the software fixes the D channel accommodation position in a channel into which a D channel is to be accommodated so that the D channel may be accommodated beginning with the LSB (least significant bit).

Further, the D channel processing condition of the line processor 18 is similar to that of the line processor 18 of the digital junction line trunk 101. Further, communication between the line processor 18 and the main controller 53 is permitted.

The digital junction line trunk 1 adds, similarly to the digital junction line trunk 101 described hereinabove, a D (control) channel to multiplexed low rate information transmitted thereto from any of the 16 Kbps speech compression trunks 6 each serving as a low rate information multiplexing trunk.

Further, the digital junction line trunk 1 decomposes each frame of a packet from a digital junction line to extract F (frame) bits and data and then decomposes the data to extract compressed speech information and D channel information.

Furthermore, the digital junction line trunk 1 reduces, in addition to the similar construction to that of the digital junction line trunk 101 described above, the rate of the D channel to make use of the remaining frequency band of the D channel for low rate information.

Figure 3:
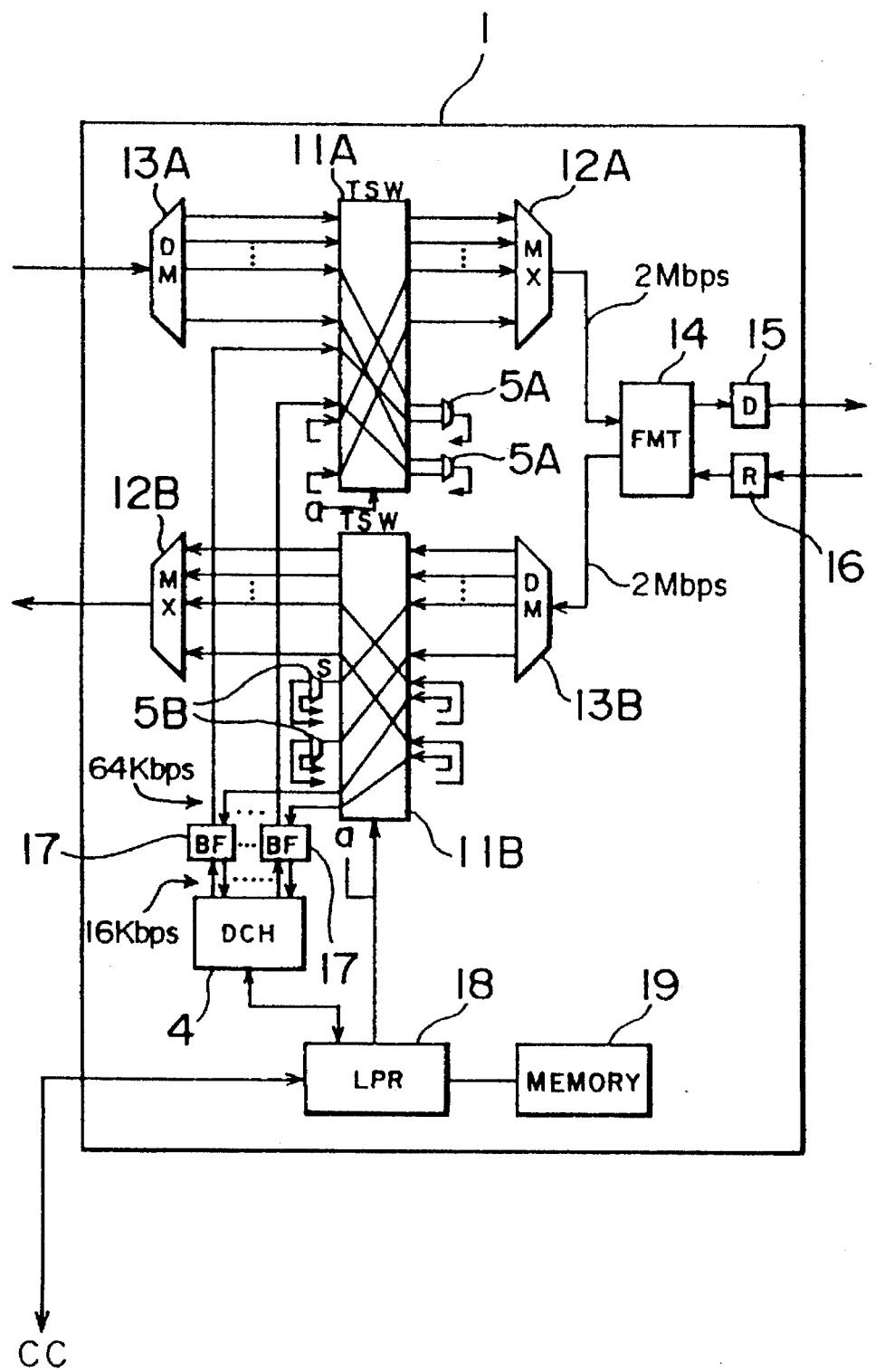
FIG. 3 is a block diagram of a digital junction line trunk for use with an exchange employed in a control channel junction line system according to the present invention.

Referring now to FIG. 3, to this end, the digital junction line trunk 1 includes, similarly to the digital junction line trunk 101 of FIG. 16, a pair of time switches 11A and 11B, a pair of multiplexing apparatus 12A and 12B, a pair of demultiplexing apparatus 13A and 13B, a deframing and framing section 14, a driver 15, a receiver 16, a line processor 18 and a memory 19.

The components of the digital junction line trunk 1 mentioned above are similar to those of the digital junction line trunk 101 of FIG. 16. It is to be noted that, while the memory 19 itself is similar to that of the digital junction line trunk 101, the software registered in it includes an additional program portion to that of the memory 19 of the digital junction line trunk 101 as seen in FIG. 4. The additional program portion illustrated in FIG. 4 is provided in order for the line processor 18 to discriminate whether or not a current channel is a low rate D channel. This information is stored also in a memory of the exchange.

The digital junction line trunk 1 further includes, in place of the control channel transmission/reception apparatus 104 of the digital junction line trunk 101, a low rate control channel transmission/reception apparatus 4 serving as low rate control channel processing means. The digital junction line trunk 1 additionally includes a plurality of buffers 17 between the low rate control channel transmission/reception apparatus 4 and the time switches 11A and 11B.

Further in the digital junction line trunk 1, the time switch 11A includes a plurality of B.D channel multiplexing apparatus 5A each serving as multiplexing means while the other time switch 11B includes a plurality of Bd channel demultiplexing apparatus 5B each serving as demultiplexing means.

Figure 18:
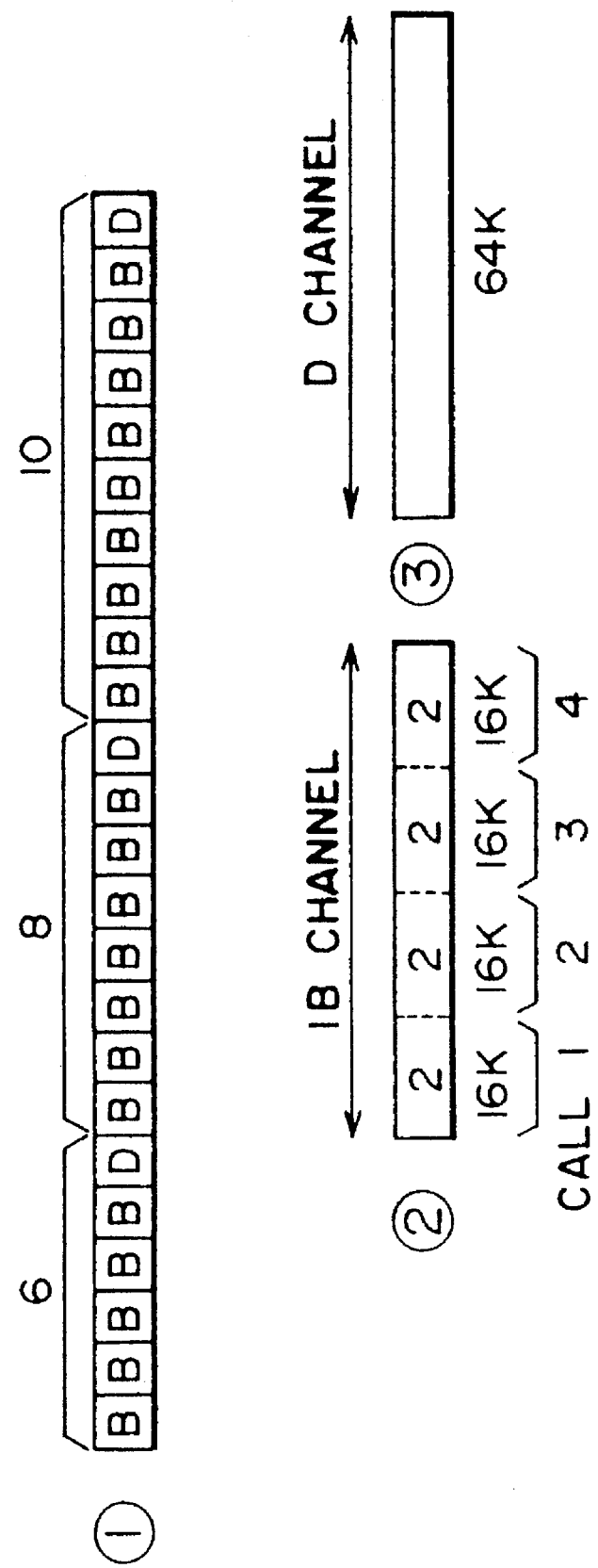
FIG. 18 is a diagram illustrating a B channel, a D channel and multiplexed data of the B channel and the D channel.

The low rate control channel transmission/reception apparatus 4 processes a D channel (refer to ③ of FIG. 18) similarly to the control channel transmission/reception apparatus 104. However, different from the control channel transmission/reception apparatus 104, the low rate control channel transmission/reception apparatus 4 transmits or receives and processes a low rate control channel.

In particular, the low rate control channel transmission/reception apparatus 4 outputs a D channel from the line processor 18 at 16 Kbps. On the other hand, when a D channel transmitted at 16 Kbps is received, the low rate control channel transmission/reception apparatus 4 changes the information to that of a predetermined rate and outputs the resulted information to the line processor 18.

The low rate control channel transmission/reception apparatus 4 is the same as the control channel transmission/reception apparatus 104 except that it is different in timing of a clock signal to be received. As a result, however, the low rate control channel transmission/reception apparatus 4 can perform such transmission and reception processing of a low rate control channel as described above.

The buffers 17 compensate for a difference in rate of flow of data between the low rate control channel transmission/ reception apparatus 4 and the time switches 11A and 11B. In particular, each of the buffers 17 changes the rate of low rate D channel information, which is to be transmitted from the low rate control channel transmission/reception apparatus 4 to the time switches 11A and 11B, from 16 Kbps to 64 Kbps, but changes the rate of information, which is to be transmitted in the reverse direction, reversely from 64 Kbps to 16 Kbps.

Each of the B.D channel multiplexing apparatus 5A multiplexes a D channel on which such control information of 16 Kbps as illustrated in FIG. 5(a) and a B channel on which compressed speech information of 48 Kbps is carried with each other into such a condition as illustrated in FIG. 5(b).

In particular, each of the B.D channel multiplexing apparatus 5A multiplexes a compressed speech signal of 48 Kbps and low rate control information of 16 Kbps into a channel, which has been used as a D channel, to produce such a low rate Bd channel of 64 Kbps as illustrated in FIG. 5(b).

Meanwhile, each of the Bd channel demultiplexing apparatus 5B demultiplexes a compressed speech signal of 48 Kbps and low rate control information of 16 Kbps of the Bd channel illustrated in FIG. 5(b) from each other to produce such a low rate D channel of 16 Kbps and compressed speech information of 48 Kbps as illustrated in FIG. 5(a).

With the exchange having such a construction as described above, the line processor 18 of the digital junction line trunk 1 starts its operation.

Then, the line processor 18 outputs control signals in accordance with contents of the software (refer to FIG. 4) thereof to the time switches 11A and 11B and the main controller 53. Consequently, such processing as described below is performed.

First, on the transmission side, compressed speech signals transmitted from the four terminals 55 are inputted to one of the 16 Kbps speech compression trunks 6 by way of the speech path 51 as seen from FIG. 6.

The 16 Kbps speech compression trunk 6 having received the compressed speech signals of the terminals 55 compresses, when it is connected to a band in which compressed speech information is to be carried, the speech information from the terminals 55 to produce a B channel having compressed speech information of 64 Kbps.

On the other hand, when the 16 Kbps speech compression trunk 6 is connected later by the digital junction line trunk 1 to another frequency band in which control information is to be carried (that is, a frequency band which is to be made a Bd channel by the digital junction line trunk 1), one of circuits having a bit rate corresponding to the bit rate for control information is disabled as seen from FIG. 6. This is because the circuit cannot be used for a call any more since control information is carried into the channel of the frequency band later by the digital junction line trunk 1.

As a result, when the 16 Kbps speech compression trunk 6 is connected later by the digital junction line trunk 1 to the frequency band in which control information is to be carried, it compresses the speech information of the three terminals 55 into the band to produce a B channel of 48 Kbps as seen from FIG. 6.

The thus obtained B channel having the compressed speech information of 64 Kbps and the B channel having the compressed speech information of 48 Kbps are successively sent in the order of production at the rate of 2 Mbps to the digital junction line trunk 1 by way of the speech path 51.

Thus, as shown in FIG. 3, the demultiplexing apparatus 13A of the digital junction line trunk 1 of another exchange successively receives such B channels (64 Kbps and 48 Kbps) as described above, demultiplexes them into B channels of the rate of 64 Kbps and outputs them in the order of transmission to the time switch 11A.

When the B channel of 64 Kbps is received, the time switch 11A replaces or re-arranges the time slot positions of the B channel and then outputs the resulted signal to the multiplexing apparatus 12A.

Then, when the next B channel of 48 Kbps is received, the time switch 11A replaces or re-arranges the time slot positions of the B channel and then outputs the resulted signal for individual frequency bands to the B.D channel multiplexing apparatus 5A allocated to the frequency bands.

In particular, the time switch 11A discriminates each of the B channels in accordance with control signals produced by the line processor 18 based on the software (refer to FIG. 4) of the memory 19, and outputs the thus discriminated channels to appropriate destinations.

Meanwhile, the low rate control channel transmission/reception apparatus 4 carries control information transmitted thereto from the line processor 18 by each 16 Kbps into a D channel and outputs the D channel at the rate of 16 Kbps to the buffers 17.

Upon reception of the D channel on which the information of 16 Kbps is carried, each of the buffers 17 outputs the thus received D channel at the rate of 64 Kbps to the time switch 11A.

Then, also the control information is processed by replacement or re-arrangement of the time slot positions by the time switch 11A similarly to the compressed speech signal described above.

Thereafter, also the control information, for which the slot positions have been replaced, is transmitted to the respective B.D channel multiplexing apparatus 5A allocated thereto by the time switch 11A.

The B channels and the D channels allocated to the predetermined B.D channel multiplexing apparatus 5A in such a manner as described above are multiplexed by the respective B.D channel multiplexing apparatus 5A.

Figure 7:
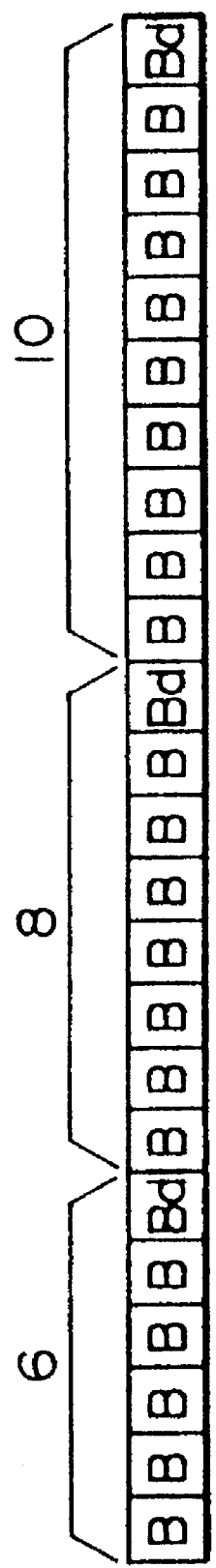
FIG. 7 is a diagrammatic view illustrating multiplexed data of a B channel and a Bd channel.

In particular, each of the B.D channel multiplexing apparatus 5A multiplexes a compressed speech signal of 48 Kbps and low rate D-channel information of 16 Kbps into one channel to produce such a low rate Bd channel as seen in FIG. 7. Then, the Bd channel thus produced is inputted to the time switch 11A from the input line side so that replacement of the time slot positions thereof is performed by the time switch 11A.

Thereafter, the Bd channel is sent to the multiplexing apparatus 12A, in which it is multiplexed with the preceding B channel transmitted to the multiplexing apparatus 12A without being multiplexed with a D channel (refer to FIG. 7).

Then, such multiplexed information of the Bd channels and the B channels is outputted at the rate of 2 Mbps to the deframing and framing section 14. Upon reception of the multiplexed channels, the deframing and framing section 14 adds F bits to each of the channels to construct digital information and outputs the digital information at the rate of 1.5 Mbps into the digital junction line (digital leased line) by way of the driver 15.

The digital junction line trunk 1 operates in such a manner as described above upon transmission. In summary, a D channel from the low rate control channel transmission/reception apparatus 4 and B channels from any of the 16 Kbps speech compression trunk 6 are multiplexed by and then sent out from the B.D channel multiplexing apparatus 5A.

On the other hand, upon reception side, the following processing is performed. In particular, digital information of 1.5 Mbps transmitted from the digital junction line is received by way of the receiver 16 by the deframing and framing section 14, in which it is decomposed into F bits and data of each frame while it remains in a multiplexed condition.

A plurality of data (refer to ① in FIG. 18) in a multiplexed condition obtained in this manner and destined for the terminals 55 are sent at the rate of 2 Mbps to the demultiplexing apparatus 13B, in which they are demultiplexed into a plurality of B channels and a plurality of Bd channels having the rate of 64 Kbps.

It is to be noted that each of the B channels is constituted only from 64 Kbps compressed speech information while each of the Bd channels is constituted from compressed speech information of 48 Kbps and control information of 16 Kbps.

Then, the thus demultiplexed data are outputted to the time switch 11B, in which each of them is processed by replacement or re-arrangement of the time slot positions. After completion of replacement of the time slot positions of the data, the Bd channels of the data are allocated to the predetermined Bd channel demultiplexing apparatus 5B by the time switch 11B.

In particular, the time switch 11B discriminates a B channel and a Bd channel as described above in accordance with a control signal produced by the line processor 18 based on the software (refer to FIG. 4) of the memory 19 and outputs B channels and Bd channels thus discriminated to appropriate ones of the Bd channel demultiplexing apparatus 5B.

A plurality of Bd channels transmitted to the Bd channel demultiplexing apparatus 5B are each demultiplexed into a D channel on which control information of 16 Kbps is carried and a B channel on which compressed speech information of 48 Kbps is carried.

D channels (16 Kbps) and B channels (48 Kbps) from the Bd channel demultiplexing apparatus 5B are inputted at the rate of 64 Kbps to the time switch 11B from the input line side, and the time slot positions of them are replaced in the time switch 11B.

Thereafter, each of the D channels (16 Kbps) after such demultiplexing is outputted to one of the buffers 17 allocated to it, and the rate of it is changed from 64 Kbps to 16 Kbps by the buffer 17, whereafter it is transmitted to the low rate control channel transmission/reception apparatus 4.

Meanwhile, each of the B channels (48 Kbps) after demultiplexing from the Bd channels is transmitted to the multiplexing apparatus 12B together with a plurality of preceding pieces of information (on which compressed speech information of 64 Kbps is carried) of B channels.

Then, the B channels of 48 Kbps and 64 Kbps are multiplexed again by the multiplexing apparatus 12B and successively sent in the order of transmission to the multiplexing apparatus 12B from the output lines of the multiplexing apparatus 12A to the speech path 51.

In short, by the processing described above, control information is removed from a Bd channel in information received so that only B channels constituted from a compressed speech signal are obtained, and the B channels thus obtained are multiplexed. Thereafter, the multiplexed information obtained in this manner is outputted at the rate of 2 Mbps to the 16 Kbps speech compression trunk 6 by way of the speech path 51.

Then, when the 16 Kbps speech compression trunk 6 receives a B channel of 64 Kbps, it decomposes the B channel into four compressed speech signals of 16 Kbps and outputs the four compressed speech signals to the predetermined four terminals 55 by way of the speech path 51.

On the other hand, when the 16 Kbps speech compression trunk 6 receives a B channel of 48 Kbps, that is, when it is connected to a B channel (originally Bd channel) on which control information is carried, it disables one of the circuits having a bit rate corresponding to a bit rate used for the B channel as seen from FIG. 6. This is because a channel which is used as a low rate D channel by the digital junction line trunk 1 cannot be used for talking.

While any of the 16 Kbps speech compression trunks 6 keeps one of the circuits disabled in this manner, it decomposes the connected B-channel of 48 Kbps into three compressed speech signals of 16 Kbps and outputs the signals to predetermined three ones of the terminals 55 by way of the speech path 51.

By the way, the control information sent to the low rate control channel transmission/reception apparatus 4 is sent to and processed by the line processor 18 and further sent to and processed by the main controller 53.

The digital junction line trunk 1 operates in such a manner as described above upon reception. In summary, upon reception, a D channel and a B channel to the 16 Kbps speech compression trunk 6 are demultiplexed by the Bd channel demultiplexing apparatus 5B, and the D channel is processed by the low rate control channel transmission/reception apparatus 4 while the B channel to the 16 Kbps speech compression trunks 6 is inputted to one of the 16 Kbps speech compression trunks 6.

Figure 10:
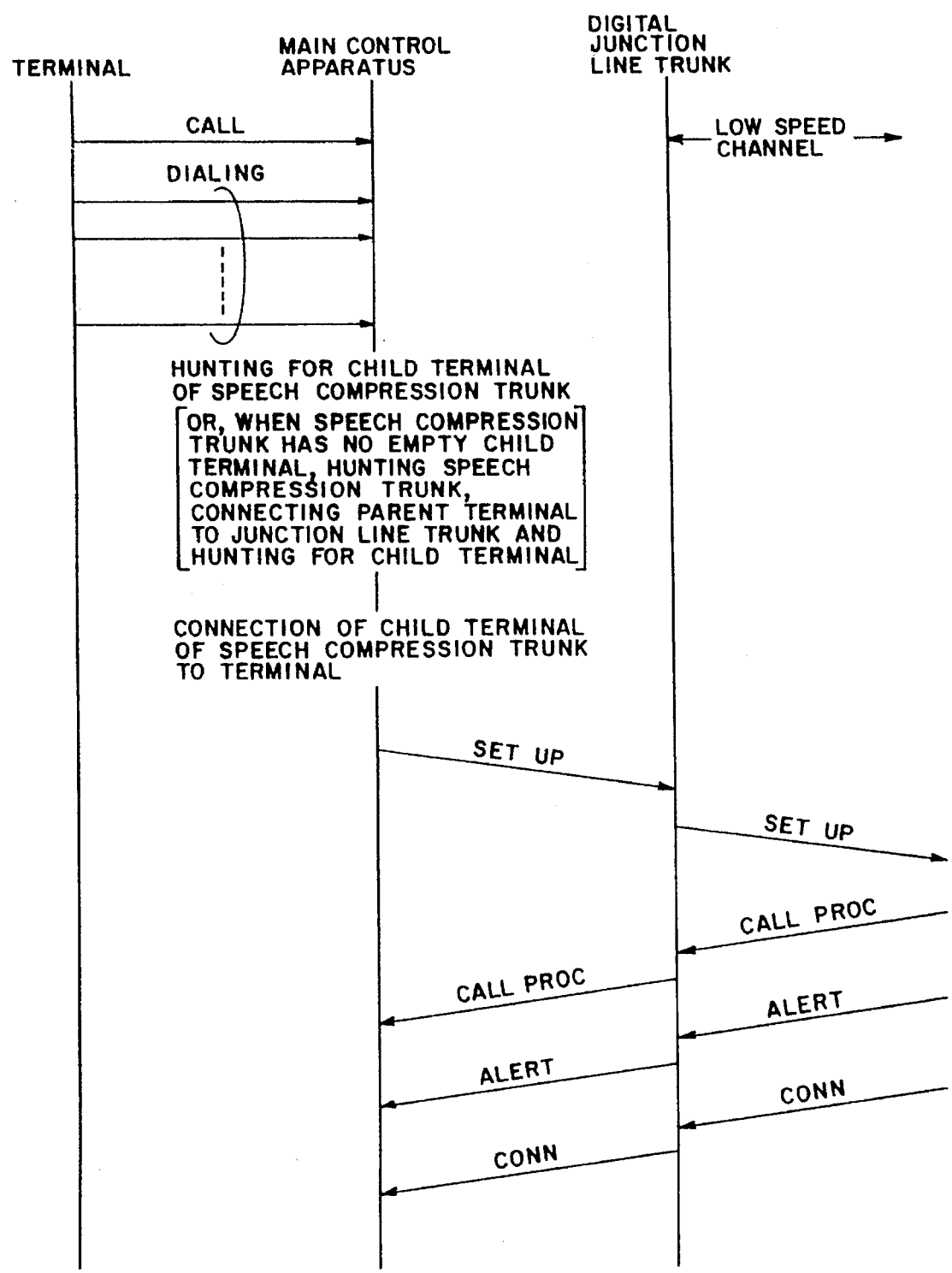
FIG. 10 is a diagram illustrating a sequence of communications of signals in the control channel junction line system.

A sequence of communications of signals after a call is sent from a terminal 55 until talk is started is illustrated in FIG. 10. Referring to FIG. 10, when a terminal 55 sends a call and sends dial information to the main controller 53, the main controller 53 hunts for a child terminal of one of the speech compression trunks 6, and if the speech compression trunk 6 has no empty trunk, then the main controller 53 hunts another one of the speech compression trunks 6 and connects a parent terminal of the speech compression trunk 6 to the digital junction line trunk 1, whereafter it hunts for a child terminal of the speech compression trunk 6. Then, it connects a child terminal of the speech compression trunk 6 to the terminal 55.

Thereafter, communications of a SET UP signal and so forth between the main controller 53 and the digital junction line trunk 1 are performed until talking is finally started.

Figure 15:
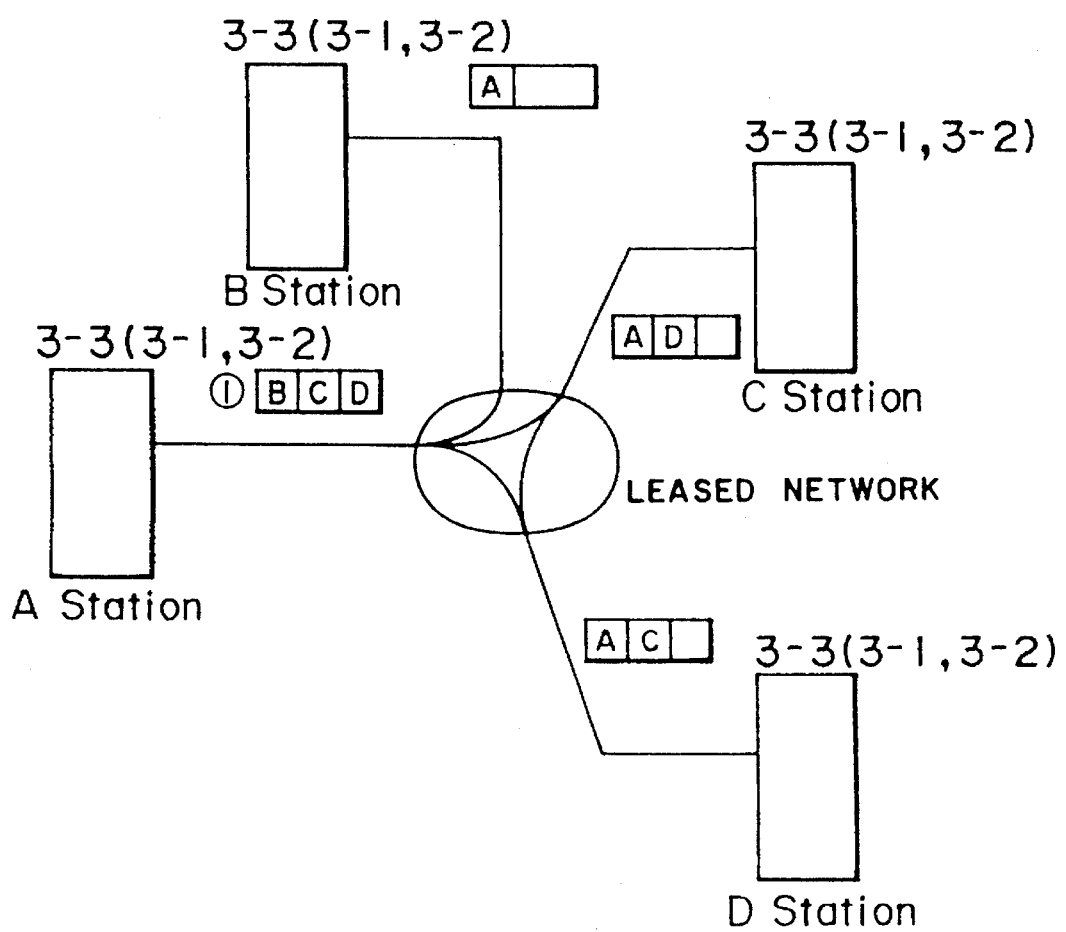
FIG. 15 is a block diagram showing a general construction of a switching network.

Such transmission and reception operations as described above are performed in this manner, and then communications are performed between the exchanges of such a switching network as shown in FIG. 15.

It is to be noted that the rate of the low rate channel need not be 16 Kbps but may alternatively be 8 Kbps or 32 Kbps. Further, the rate of the D channel can be set for each circuit, and also a command can be registered.

In this manner, in the exchange 3 which includes the digital junction line trunk 1 and the 16 Kbps speech compression trunks 6 which each serves as a low rate information multiplexing trunk, since it includes the low rate control channel transmission/reception apparatus 4, the B.D channel multiplexing apparatus 5A and the Bd channel demultiplexing apparatus 5B and the low rate information multiplexing trunk 2 is the low rate information multiplexing trunk 6, the rate for the D channel can be made low and the remaining frequency band can be used for a compressed speech signal, and consequently, the efficiency in use of the channel can be raised.

Figure 17:
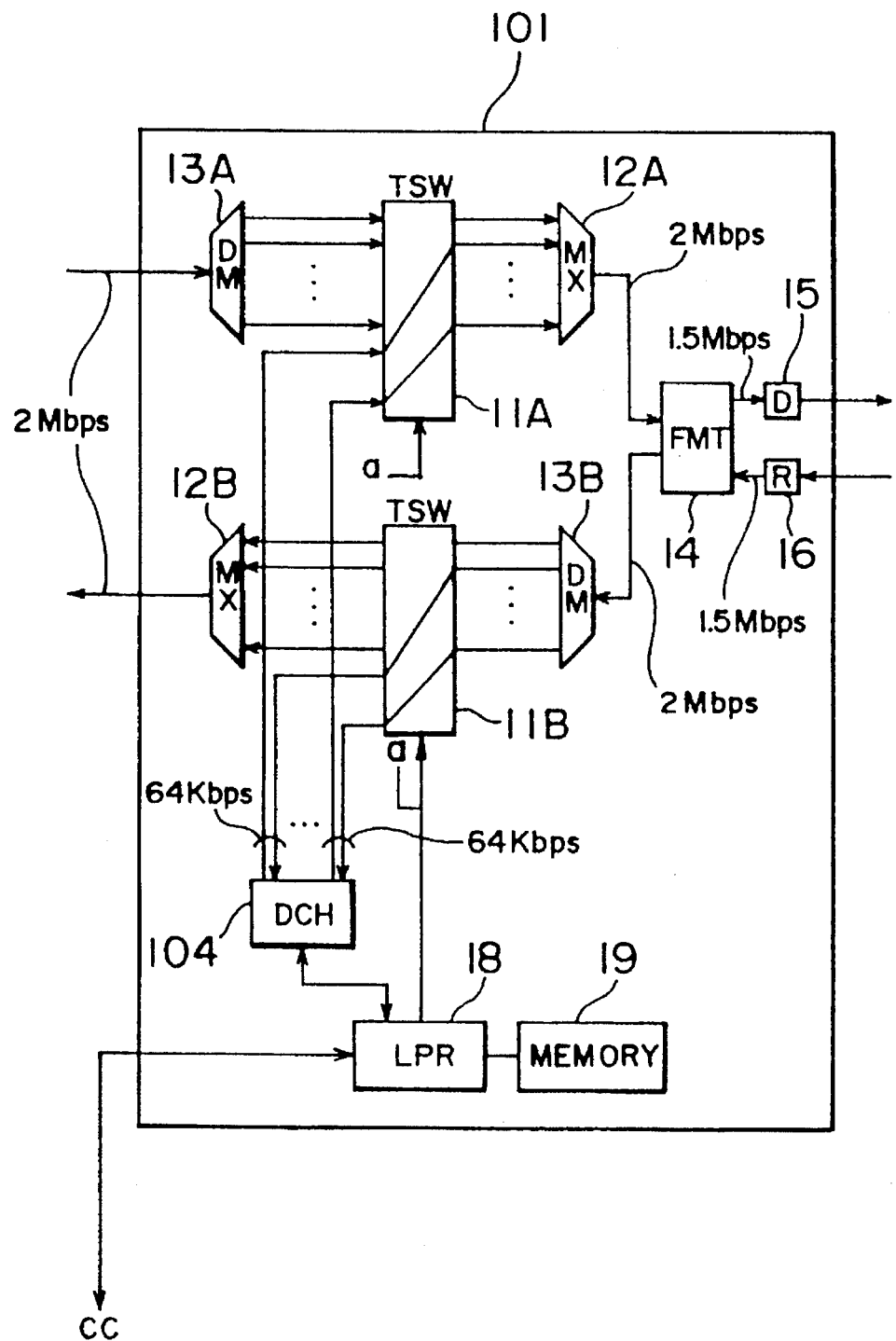
FIG. 17 is a block diagram showing a typical digital junction line trunk for use with an exchange.

Further, since the low rate control channel transmission/ reception apparatus 4 and the B.D channel multiplexing apparatus 5A as well as the Bd channel demultiplexing apparatus 5B are provided in the digital junction line trunk 1, the effect can be enhanced efficiently. Further, such effect can be achieved only by improvement of additional provision of the B.D channel multiplexing apparatus 5A and the Bd channel demultiplexing apparatus 5B for a digital junction line trunk of such an exchange as shown in FIG. 17.

Figure 8:
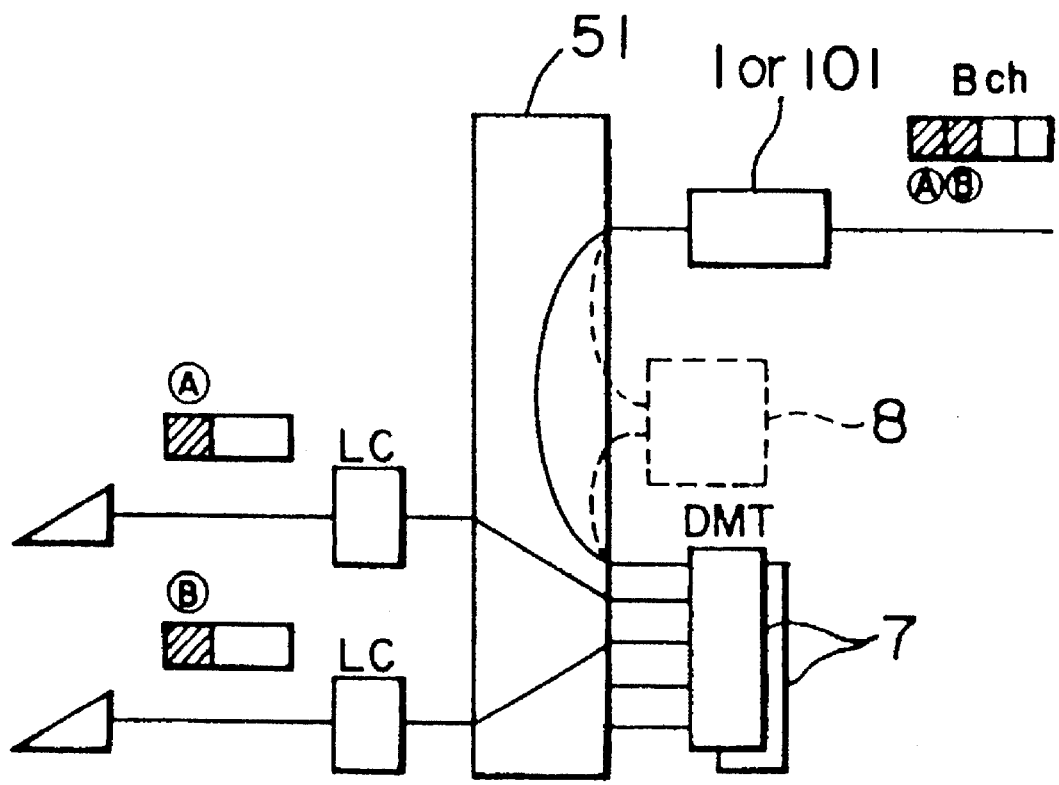
FIG. 8 is a block diagram showing another exchange wherein a low rate data call multiplexing trunk is employed as a low rate information multiplexing trunk.

It is to be noted that such operation of the first embodiment as described above is similar with such a low rate information multiplexing trunk in which the low rate data call multiplexing trunk 7 is used for connection as shown in FIG. 8.

Figure 9:
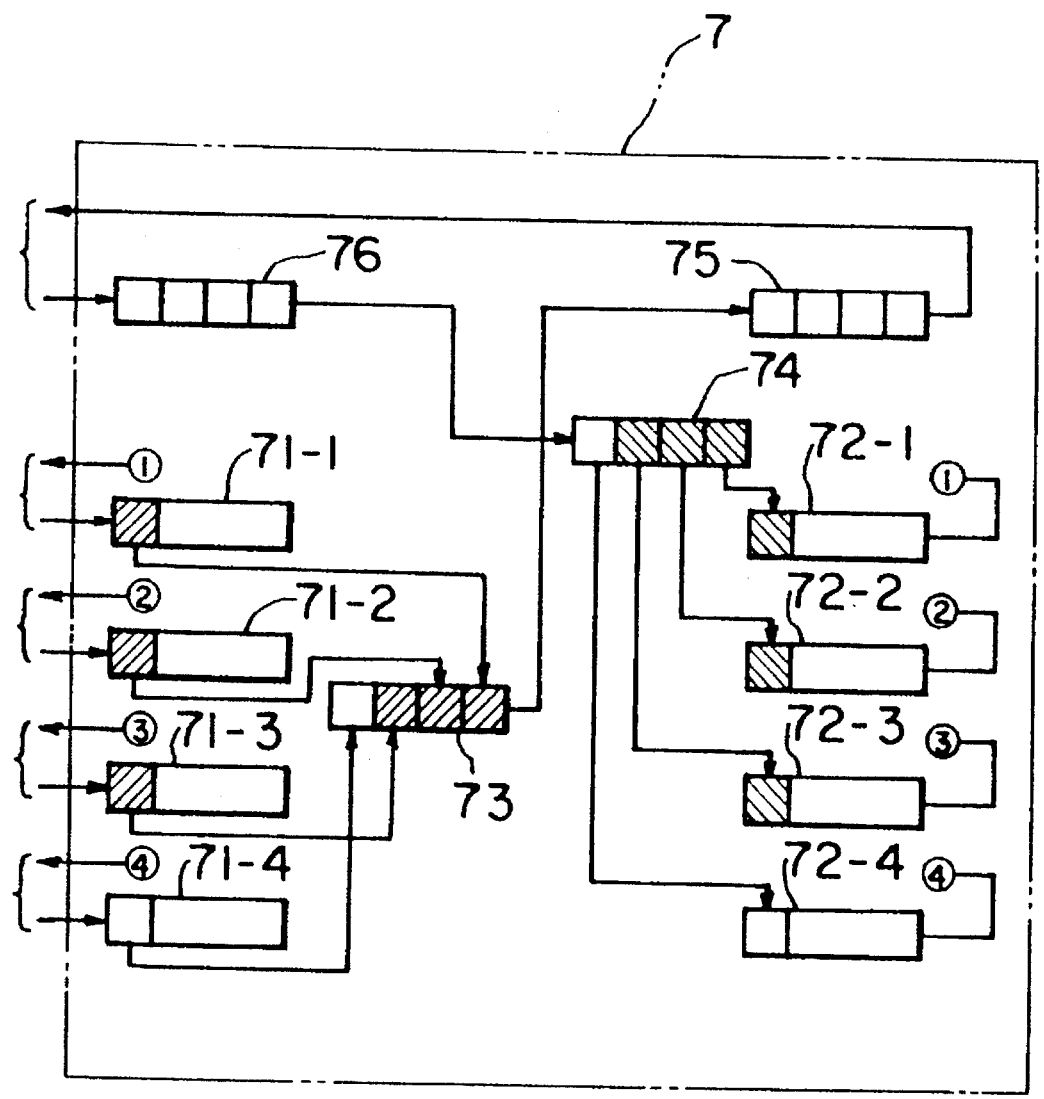
FIG. 9 is a block diagram showing details of the low rate data call multiplexing trunk shown in FIG. 8.

The low rate data call multiplexing trunk 7 in this instance has such a construction as shown in FIG. 9. Referring to FIG. 9, the low rate data call multiplexing trunk 7 includes input buffers 71-1 to 71-4, output buffers 72-1 to 72-4, edition buffers 73 and 74 and rate changing buffers 75 and 76.

In the low rate data call multiplexing trunk 7, input data from the terminals 55 are supplied by way of, for example, the input buffers 71-1 to 71-3 to the edition buffer 73, in which they are multiplexed with each other. Then, the data are outputted to the digital junction line trunk 1 side by way of the rate changing buffer 75. On the other hand, input data from the digital junction line trunk 1 are supplied by way of the rate changing buffer 76 to the edition buffer 74, in which they are processed by demultiplexing processing. Then, the data are outputted to particular ones of the terminals 55 by way of, for example, the output buffers 72-1 to 72-3.

Since the low rate data call multiplexing trunk 7 is used as a low rate information multiplexing trunk, even when data of a picture signal or the like are used, similar effects to those of the speech described above can be achieved.

c. Second Embodiment

Figure 11:
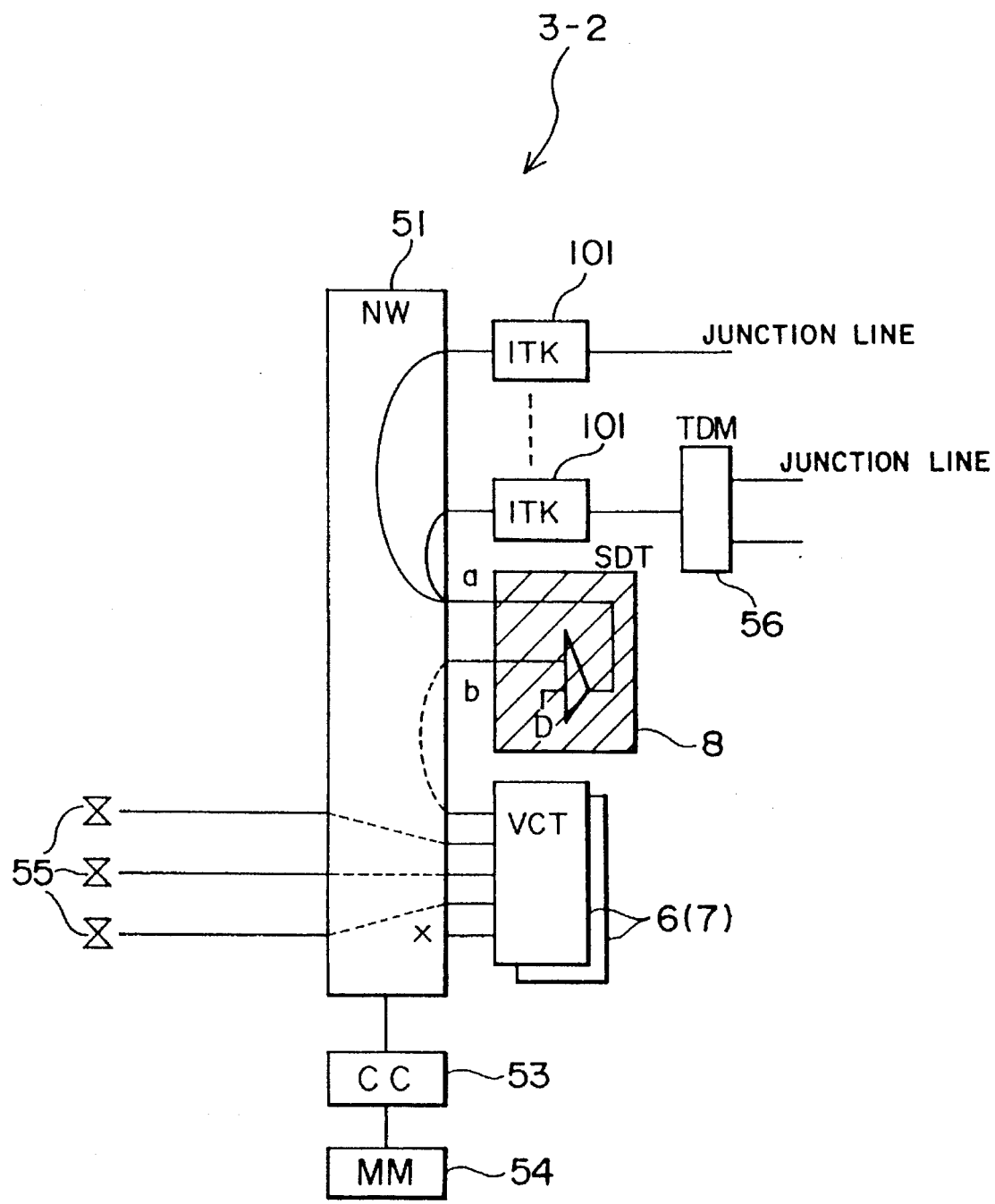
FIG. 11 is a block diagram of a further exchange in another control channel junction line system according to a second preferred embodiment of the present invention.
Figure 19:
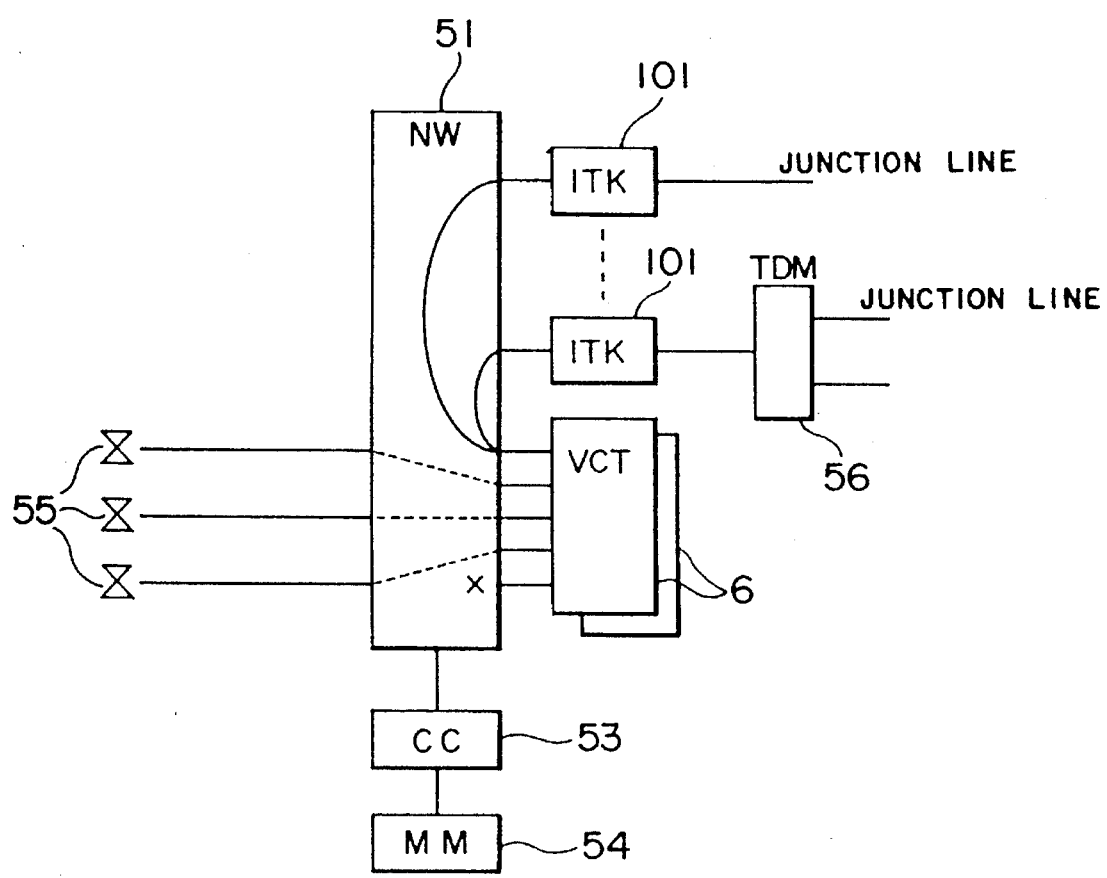
FIG. 19 is a block diagram showing another exchange having a plurality of digital junction line trunks.

Referring now to FIG. 11, there is shown an exchange for use with a control channel junction line system according to a second preferred embodiment of the present invention. The exchange is generally denoted at 3-2 and has a similar construction to that of the exchange shown in FIG. 19 except that it additionally includes an 8-circuit subrate control channel trunk (subrate control channel trunk, SDT) 8 connected in a speech path 51 which includes a plurality of digital junction line trunks 101.

In particular, information from the 8-circuit subrate control channel trunk 8 is physically connected fixedly to particular channels on the digital junction line trunks 101 by way of the speech path 51.

Figure 12:
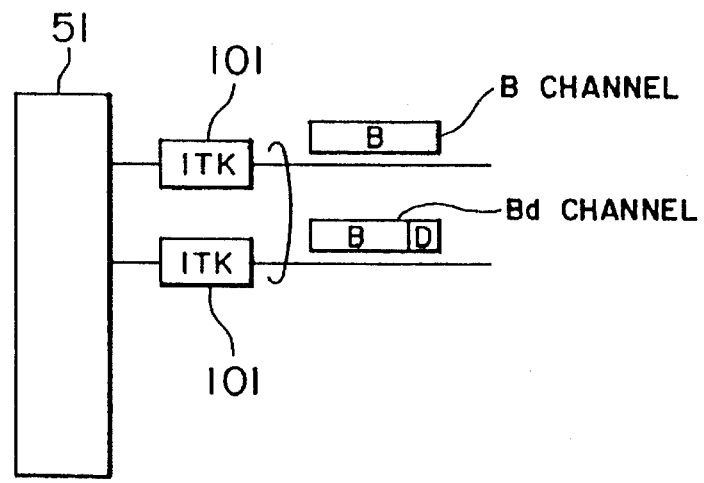
FIG. 12 is a block diagram illustrating logical processing of an 8-circuit subrate control channel trunk of the exchange shown in FIG. 11.

Meanwhile, theoretically the exchange 3-2 registers the 8-circuit subrate control channel trunk 8 and the digital junction line trunks 101 as a same interface group as seen in FIG. 12. This is because the software of FIG. 4 handles the 8-circuit subrate control channel trunk 8 similarly as the digital junction line trunks 101.

The other construction of the exchange 3-2 is similar to that of the exchange 3-1 described hereinabove with reference to FIG. 16. It is to be noted that the hardware and the software of the digital junction line trunks 101 are same as those of the digital junction line trunk shown in FIG. 17.

The digital junction line trunks 101 may otherwise be constructed eliminating the low rate control channel transmission/reception apparatus 4, the line processor 18 and the memory 19.

In this instance, however, the software registered in the main controller 54 for operating the 16 Kbps speech compression trunk 6 is similar to that employed in the exchange 3-1 described hereinabove.

Here, the 8-circuit subrate control channel trunk 8 registers a circuit as a junction line of 1B+1D per one circuit and can register 8 circuits in the maximum.

The 8-circuit subrate control channel trunk 8 multiplexes compressed speech information and a low rate D channel received from any of the 16 Kbps speech compression trunk 6 by way of the speech path 51 to produce a Bd channel (refer to FIG. 7).

The 8-circuit subrate control channel trunk 8 connects a Bd channel (a channel in which a D channel is contained) fixedly to a 1B channel of one of the digital junction line trunks 101 by means of an electronic IDF.

Further, the 8-circuit subrate control channel trunk 8 demultiplexes a Bd channel transmitted thereto from any of the digital junction lines into a D channel and a B channel which includes compressed speech information.

Figure 13:
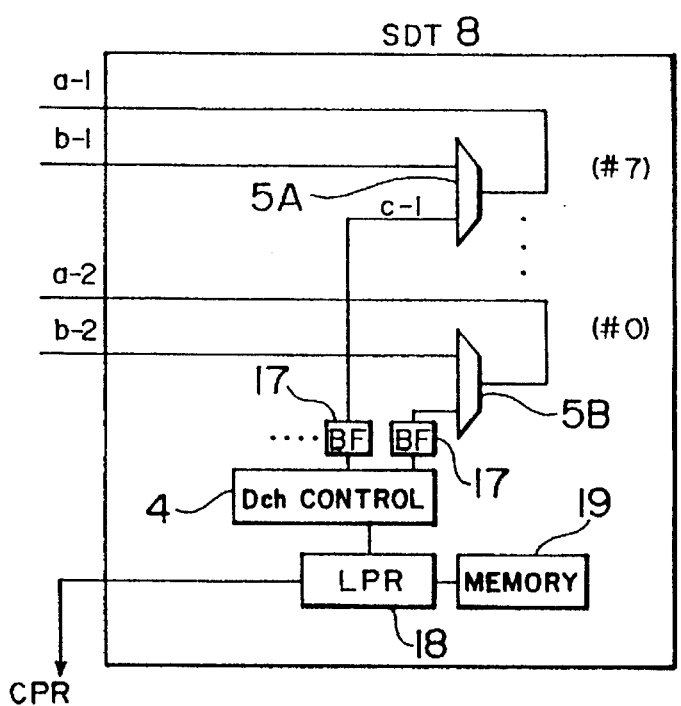
FIG. 13 is a block diagram showing a construction of the 8-circuit subrate control channel trunk shown in FIG. 12.

To this end, referring to FIG. 13, the 8-circuit subrate control channel trunk 8 includes a plurality of B.D channel multiplexing apparatus 5A and a Bd channel demultiplexing apparatus 5B as well as a number of buffers 17 equal to the number of B.D channel multiplexing apparatus 5A and Bd channel demultiplexing apparatus 5B, and further includes a low rate control channel transmission/reception apparatus 4, a line processor 18 and a memory 19. The components of the 8-channel subrate control channel trunk 8 are similar to those in the first embodiment described hereinabove.

In short, the 8-circuit subrate control channel trunk 8 connects multiplexed information from the built-in B.D channel multiplexing apparatus 5A to the digital junction line trunks 101 by way of the speech path 51 of the exchange 3-2.

Further, the 8-circuit subrate control channel trunk 8 connects information from the built-in Bd channel demultiplexing apparatus 5B to one of the 16 Kbps speech compression trunks 6 by way of the speech path 51 of the exchange 3-2.

When compressed speech information and the D channel are not to be multiplexed, speech signals from the four terminals 55 are transmitted to the 16 Kbps speech compression trunk 6 by way of the speech path 51. Then, the speech signals are compressed by speech compression by one of the 16 Kbps speech compression trunks 6 to produce a B channel which only has compressed speech information of 64 Kbps.

Thereafter, the B channel (64 Kbps) is connected to the digital junction line trunk 101 call by call by way of the speech path 51.

On the other hand, when compressed speech information and the D channel are to be multiplexed, one of the 16 Kbps speech compression trunks 6 is connected to a circuit of the 8-circuit subrate control channel trunk 8 by way of the speech path 51 as seen from FIG. 11, and the compressed speech information and the low rate D channel are multiplexed with each other by the circuit of the 8-circuit subrate control channel trunk 8. In this instance, one of the circuits having a bit rate corresponding to the bit rate of the low rate D channel in the 16 Kbps speech compression trunk 6 is disabled as seen in FIG. 11.

This is because the bit rate which is used for the low rate D channel (Bd channel) by way of a digital junction line trunk 101 cannot be used for talk any more.

In this condition, in order to effect multiplexing except for a circuit having a bit rate corresponding to the bit rate for control information, the 16 Kbps speech compression trunk 6 compresses the speech signals from the three terminals 55 into one B channel for each 16 Kbps.

As a result, the B channel on which the compressed speech information of 48 Kbps is carried is produced. Thereafter, the B channel (48 Kbps) is sent at the rate of 2 Mbps to the 8-circuit subrate control channel trunk 8 by way of the speech path 51.

In short, the compressed speech information produced in such a manner as described above is outputted in the B-channel of 48 Kbps to the 8-circuit subrate control channel trunk 8 by way of the speech path 51.

In the 8-circuit subrate control channel trunk 8, the B channel multiplexed by the 16 Kbps speech compression trunk 6 (that is, the B channel in which the compressed speech information is included at 48 Kbps) is transmitted at the rate of 2 Mbps to the transmission side, that is, to one of the B.D channel multiplexing apparatus 5A (refer to b-1 of FIG. 13). The line processor 18 outputs control information to the low rate control channel transmission/reception apparatus 4.

Upon reception of the control information, the low rate control channel transmission/reception apparatus 4 outputs the same by way of a corresponding one of the buffers 17 to send out the D channel having the control information of 16 Kbps (the remaining 48 Kbps is dummy information) at the rate of 64 Kbps to the one B.D channel multiplexing apparatus 5A.

Upon reception of the B channel of 48 Kbps and the D channel of 16 Kbps, the one B.D channel multiplexing apparatus 5A multiplexes the received B channel and D channel to produce a Bd channel having the speech information of 48 Kbps and the control information of 16 Kbps (refer to b and a of FIG. 5). Then, the B.D channel multiplexing apparatus 5A outputs the Bd channel at the rate of 2 Mbps from the output line (a-1 in FIG. 13) thereof. Such processing is repeated for each circuit so that a plurality of Bd channels are outputted corresponding to the different circuits.

In this manner, on the transmission side, each of the B.D channel multiplexing apparatus 5A of the 8-channel subrate control channel trunk 8 multiplexes the D channel from the low rate control channel transmission/reception apparatus 4 and information from the 16 Kbps speech compression trunk 6.

By the way, to the reception side of the 8-circuit subrate control channel trunk 8, that is, to the Bd channel demultiplexing apparatus 5B, a Bd channel is transmitted at the rate of 2 Mbps by way of one of the digital junction line trunks 101 and the speech path 51. In other words, multiplexed channels are received from the input lines (a-1 and a-2 of FIG. 13) to the Bd channel demultiplexing apparatus 5B as seen from FIG. 11.

It is to be noted that each of the channels constituting the multiplexed information described above is a Bd channel including control information of 16 Kbps and a compressed speech signal of 48 Kbps. When such Bd channel is transmitted to the Bd channel demultiplexing apparatus 5B from one of the input lines (a-2 in FIG. 13), it performs demultiplexing of the Bd channel. In particular, the Bd channel demultiplexing apparatus 5B demultiplexes the Bd channel into a D channel having control information of 16 Kbps and a B channel having compressed speech information of 48 Kbps (refer to a and b of FIG. 5).

Then, the D-channel of 16 Kbps thus obtained by multiplexing by the Bd channel demultiplexing apparatus 5B is supplied by way of the buffer 17 to and processed by the low rate control channel transmission/reception apparatus 4 and further supplied to the main controller 53. Meanwhile, the B channel of 48 Kbps is outputted at the rate of 2 Mbps from one of the output lines (b-2 of FIG. 13) to the one of 16 Kbps speech compression trunks 6 by way of the speech path 51.

Such processing is repeated for each channel so that control information and compressed speech information can be obtained separately from information transmitted to the exchange.

Any of the 16 Kbps speech compression trunks 6 receives a B channel of 48 Kbps by way of the speech path 51 (a circuit having a bit rate corresponding to the bit rate which has been used for the Bd channel is disabled).

In other words, when one of the 16 Kbps speech compression trunks 6 is connected to a channel (originally Bd channel) on which control information has been carried, a circuit corresponding to the frequency band which has been used for the Bd channel is disabled.

This is because the channel (Bd channel) which is used as a low rate D channel by the digital junction line trunk 101 cannot be used for talk.

After such processing is executed, the 16 Kbps speech compression trunk 6 decompresses the compressed speech information in the B channel of 48 Kbps back into that before compression. Then, the speech signal in the non-compressed condition is decomposed into three signals and sent out to the other object terminals 55 by way of the speech path 51 as seen from FIG. 11.

Summarizing the operations on the reception side described above, first the 8-circuit subrate control channel trunk 8 demultiplexes a D channel (16 Kbps) and a B channel (48 Kbps) destined for a 16 Kbps speech compression trunk 6 by means of the Bd channel decompressing apparatus 5B.

The D channel is processed by the low rate control channel transmission/reception apparatus 4 while the information to 16 Kbps speech compression trunk 6 is inputted to one of the 16 Kbps speech compression trunks 6.

Then, when the low rate information multiplexing trunk 6 is connected to the Bd channel on which the control information has been carried (the compressed speech information is 48 Kbps), a circuit having a bit rate corresponding to the frequency band used for the channel is disabled.

Figure 14:
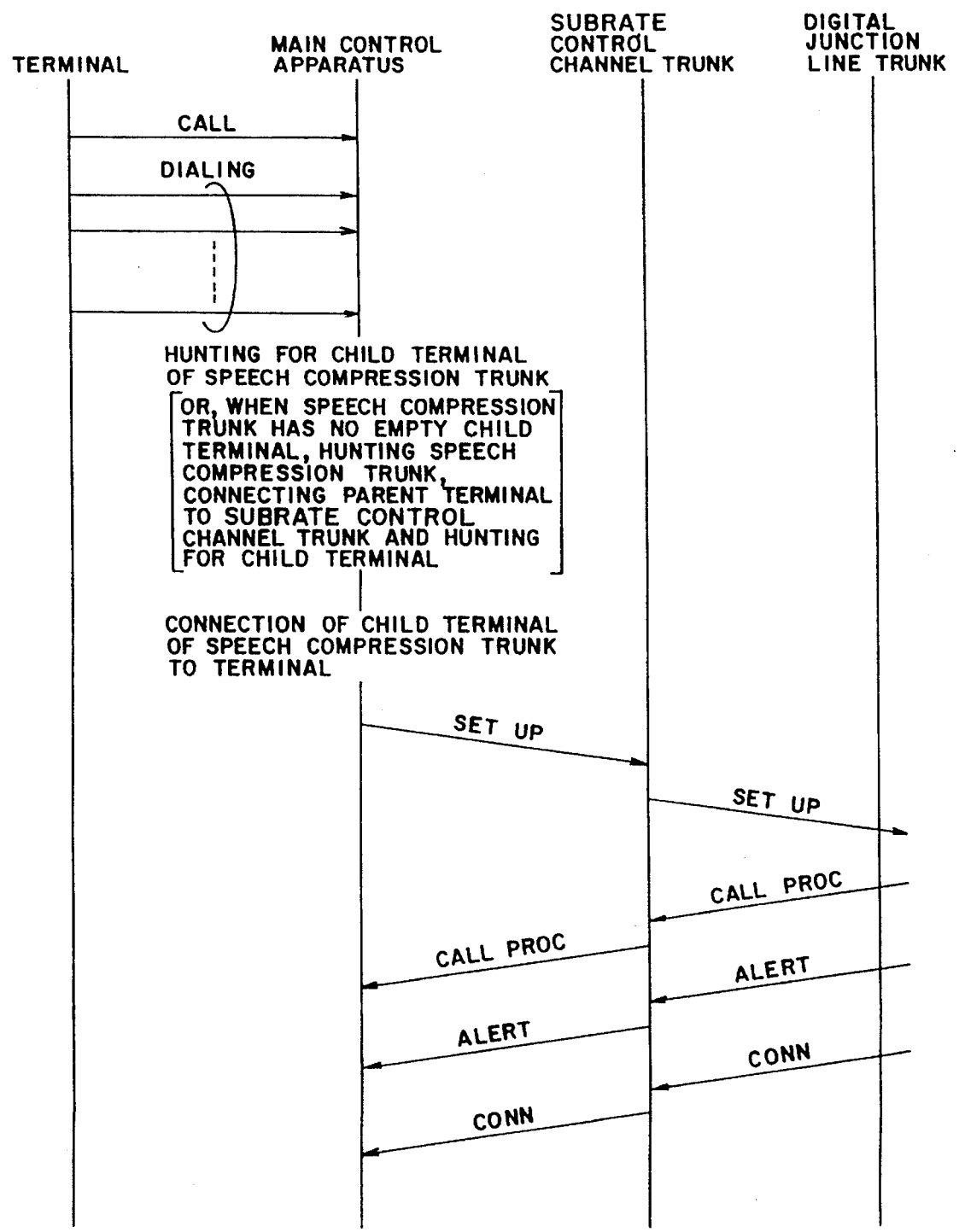
FIG. 14 is a diagram illustrating a sequence of communications of signals in the control channel junction line system of the second embodiment.

A sequence of communications of signals after a terminal 55 sends a call until talk is started is illustrated in FIG. 14. Referring to FIG. 14, if a terminal 55 sends a call and sends dial information to the main controller 53, the main controller 53 hunts for a child terminal of one of the speech compression trunks 6. If the speech compression trunk 6 has no empty child terminal, the main controller 53 hunts a second one of the speech compression trunks 6, interconnects a parent terminal of the speech compression trunk 6 and the 8-circuit subrate control channel trunk 8, and hunts for a child terminal of the speech compression trunk 6. Then, the main controller 53 connects the child terminal of the speech compression trunk 6 to the terminal 55.

Thereafter, communications of signals such as a SET UP signal are performed between the main controller 53, the eight-circuit subrate control channel trunk 8 and the digital junction line trunk 101 until a talking condition is entered.

Such transmission and reception processing as described above is performed in this manner, and further, communications are performed between the exchanges of such a switching network as described hereinabove with reference to FIG. 15.

It is to be noted that such processing as described above in the second embodiment of the present invention is performed similarly also with a connection which employs such a low rate data call multiplexing trunk 7 as described hereinabove with reference to FIG. 8. In short, such transmission and reception processing as described above is performed so that communications between the exchanges of such a switching network as described hereinabove with reference to FIG. 16 are performed.

In this manner, by the exchange 3 which includes the digital junction line trunk 101 and the low rate information multiplexing trunk 2 as well as the 8-circuit subrate control channel trunk 8 including the low rate control channel transmission/reception apparatus 4 and the B.D channel multiplexing apparatus 5A and the Bd channel demultiplexing apparatus 5B and wherein the 8-circuit subrate control channel trunk 8 and the digital junction line trunk 101 can be handled as an interface group, and by employing the low rate information multiplexing trunk of trunks 6 for the low rate information multiplexing trunk 2, the rate of the D channel can be reduced and the remaining band can be used for a compressed speech signal, and consequently, the efficiency in use of the channel is enhanced.

Further, the low rate D channel can be realized and the remaining frequency band can be used for a compressed speech signal only by providing the 8-circuit subrate control channel trunk 8 for the speech path without modifying the digital junction line trunk 101 in the exchange shown in FIG. 17. As a result, there is no necessity of preparing digital junction line trunks for low rate D channels for different types of interfaces.

Further, even if the low rate control channel transmission/reception apparatus 4, the line processor 18 and the memory 19 are eliminated from the digital junction line trunk 101, such effects as those described above can still be achieved. Consequently, the cost of the exchange can be suppressed low.

Further, where the low rate data call multiplexing trunk 7 is employed for the low rate information multiplexing trunk 2, even when data of an image signal or the like are used, similar effects to those described above can be achieved.

Further, it is possible to connect a B channel.

The present invention is not limited to the specifically described embodiment, and variations and modifications may be made without departing from the scope of the present invention.

What is claimed is:

1. An exchange connected to a control channel junction line, comprising:

a low rate information multiplexing trunk;

a plurality of subscriber circuits connected to said low rate information multiplexing trunk; and a digital junction line trunk including:

low rate control channel processing means for processing a low rate control channel information, and multiplexing/demultiplexing means for multiplexing/demultiplexing the low rate control channel information and low rate talking channel information of said low rate information multiplexing trunk; and wherein:

when said low rate information multiplexing trunk is connected to a channel for control channel information one of said subscriber circuits which has a bit rate corresponding to a bit rate used for control information is disabled, and upon transmission, the low rate control channel information from said low rate control channel processing means and the low rate talking channel information from said low rate information multiplexing trunk are multiplexed with each other by and sent out from said multiplexing/demultiplexing means of said digital junction line trunk, whereas upon reception, the low rate control channel information and the low rate talking channel information to said low rate information multiplexing trunk are demultiplexed by said multiplexing/demultiplexing means, and the low rate control channel information is processed by said low rate control channel processing means while the low rate talking channel information to said low rate information multiplexing trunk is inputted to said low rate information multiplexing trunk.

2. An exchange connected to a control channel junction line as claimed in claim 1, wherein said low rate information multiplexing trunk is a speech compression trunk.

3. An exchange connected to a control channel junction line as claimed in claim 1, wherein said low rate information multiplexing trunk is a low rate data call multiplexing trunk.

4. An exchange connected to a control channel junction line, comprising:

a plurality of subscriber circuits;

a digital junction line trunk;

a low rate information multiplexing trunk coupled to said circuits; and a subrate control channel trunk coupled to said digital junction line trunk and to said low rate information multiplexing trunk and including low rate control channel processing means for processing low rate control channel information, and multiplexing/demultiplexing means for multiplexing/demultiplexing the low rate control channel information and low rate talking channel information of said low rate information multiplexing trunk, said subrate control channel trunk fixedly connecting multiplexed information from said multiplexing/demultiplexing means to said digital junction line trunk by way of a path line, said exchange being capable of handling said subrate control channel trunk and said digital junction line trunk as an interface group, and wherein:

when said low rate information multiplexing trunk is connected to a channel for the control channel information, one of said subscriber circuits which has a bit rate corresponding to a bit rate used for control information is disabled, and upon transmission, the low rate control channel information from said low rate control channel processing means and the low rate talking channel information from said low rate information multiplexing trunk are multiplexed with each other by and sent out from said multiplexing/demultiplexing means of said subrate control channel trunk, whereas upon reception, the low rate control channel information and the low rate talking channel information to said low rate information multiplexing trunk are demultiplexed from each other by said multiplexing/demultiplexing means of said subrate control channel trunk, and the low rate control channel information is processed by said low rate control processing means while the low rate talking channel information to said low rate information multiplexing trunk is inputted to said low rate information multiplexing trunk.

5. An exchange connected to a control channel junction line as claimed in claim 4, wherein said low rate information multiplexing trunk is a speech compression trunk.

6. An exchange connected to a control channel junction line as claimed in claim 4, wherein said low rate information multiplexing trunk is a low rate data call multiplexing trunk.

* * * * *